Nov. 30, 1971   J. A. BAUER   3,623,374
VIBRATION ANALYZING APPARATUS
Filed Dec. 19, 1969
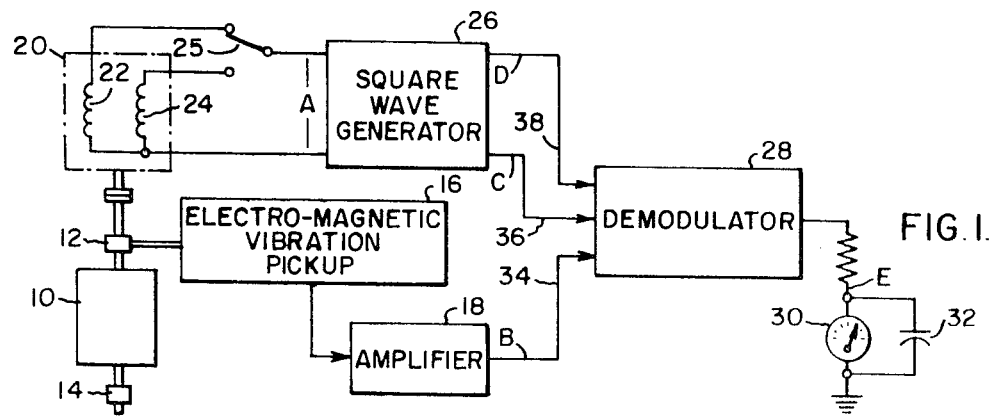
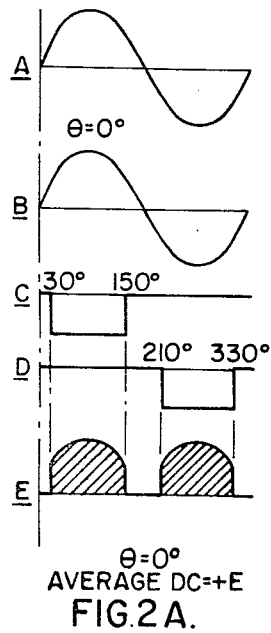
FIG. 2A.
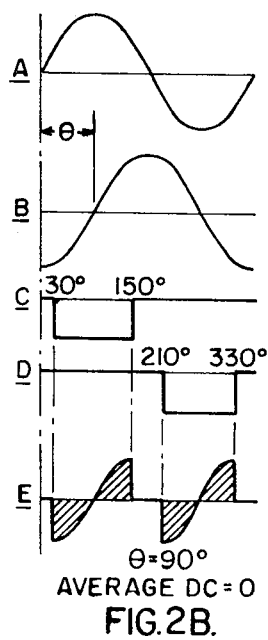
FIG. 2B.
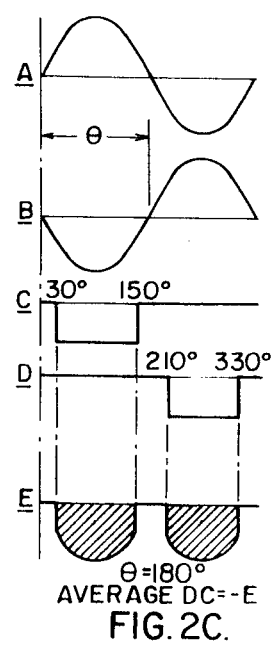
FIG. 2C.
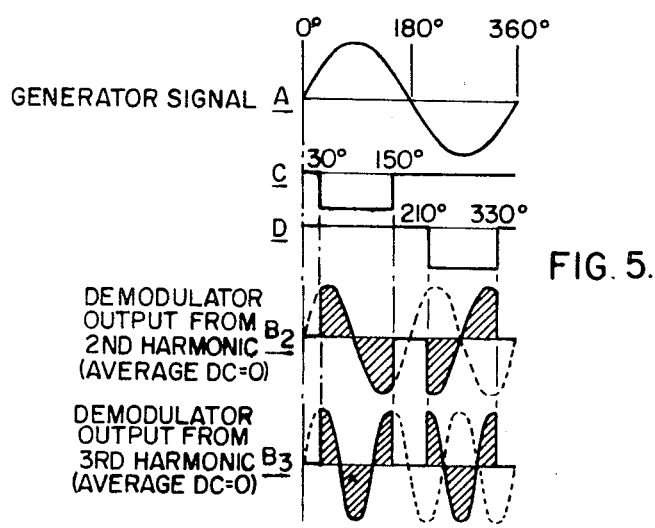
FIG. 5.

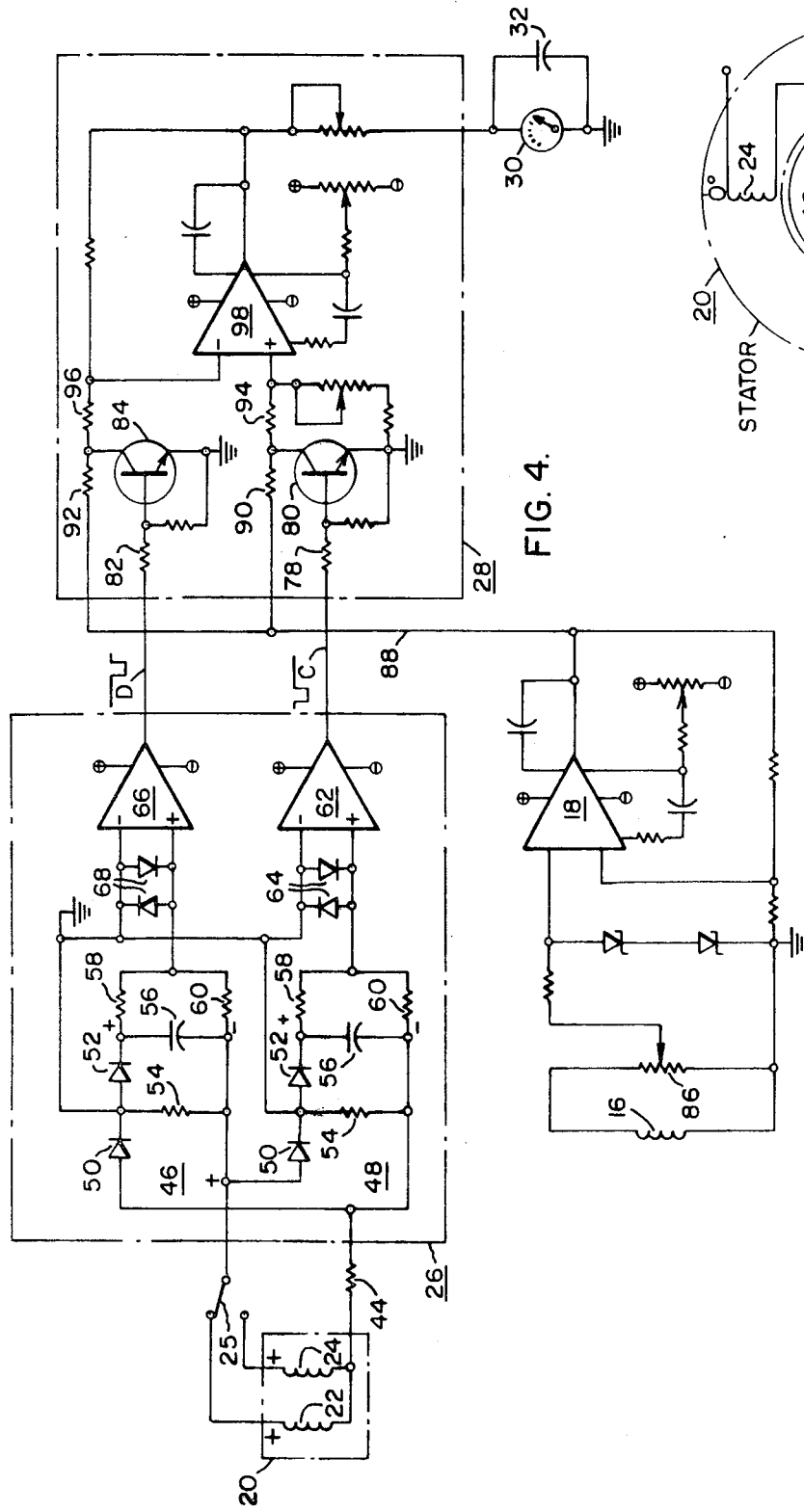
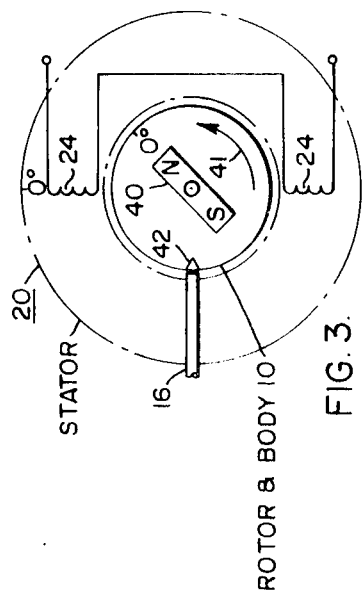

United States Patent Office 3,623,374
Patented Nov. 30, 1971

3,623,374
VIBRATION ANALYZING APPARATUS
James A. Bauer, Monroeville, Pa., assignor to Westinghouse Electric Corporation, Pittsburgh, Pa.
Filed Dec. 19, 1969, Ser. No. 886,695
Int. Cl. G01m 1/22
U.S. Cl. 73—462
7 Claims

ABSTRACT OF THE DISCLOSURE

Vibration analyzing apparatus of the wattmeter type, but wherein the wattmeter is replaced by a demodulator circuit which does not require calibration for different operating speeds of a body to be balanced. The apparatus additionally incorporates means including a unique square wave generator for eliminating harmonics other than the fundamental frequency corresponding to the speed of the body being balanced. The means for eliminating harmonics is not a filter in the true sense of the word, but rather is based upon gating harmonic signals with square wave signals whereby the average direct current output due to harmonics will always be zero.

CROSS-REFERENCES TO RELATED APPLICATIONS

Ser. No. 1,354 filed by James A. Bauer and Dexter V. Wright on Jan. 8, 1970, entitled "Vibration Pickup Device" and assigned to the present assignee.

BACKGROUND OF THE INVENTION

Measurements of rotor vibration amplitudes, and their phase with respect to an arbitrary angular reference on a rotor can usually be interpreted in terms of amount and angular location of unbalanced mass in arbitrary planes normal to the rotor axis. One type of balancing equipment commonly used to make these measurements consists of (1) a sine wave generator attached to the rotating mass to be balanced; (2) a vibration pickup capable of converting the mechanical oscillations of a vibrating rotor into a sinusoidal alternating current displacement voltage; and (3) a sensitive wattmeter, having one of its coils connected to the generator output circuit while the other coil is connected to the vibration pickup.

In operation, the generator and pickup are connected to the respective coils of a wattmeter; and a reading is obtained which is proportional to $$VI \cos X$$

where V is the pickup voltage applied to the wattmeter voltage coil, I is the sine wave generator current flowing through the wattmeter current coil, and X is the phase angle between V and I. By shifting the generator stator angularly (i.e., shifting the phase angle X of the generator voltage with respect to the pickup voltage), the wattmeter can be made to read zero or a maximum. As a rule, the generator stator setting for zero wattmeter reading is used as a phase reference with suitable calibration. The vibration amount reading can be obtained by mechaniay shifting the generator stator 90° from the setting for zero wattmeter reading. Preferaby, however, the generator is equipped with two windings spaced 90° apart so that vibration amount readings can be obtained conveniently by switching from one winding to the other. Two generator windings also permit a fixed setting of the generator angular position, and an equivalent procedure of measuring components along right angle axes can be carried out.

Besides permitting the measurement of phase and amount of pickup voltage, the wattmeter is effective in filtering out harmonics other than the fundamental frequency corresponding to the speed of rotation of the rotor being balanced, provided the generator voltage across the current coil of the wattmeter, is a pure sine wave. Actually, however, the generator voltage will have about 2% of each of the second and third harmonics, so that balancing errors are possible from higher harmonics in the vibration pickup. This is especially true of the second harmonic which is frequently encountered in mechanical systems and which may be quite pronounced.

It was assumed in the foregoing discussion that the magnitude of the generator current I was a constant value which determined the calibration of the equipment. This means that the generator current flowing in the wattmeter coil must be manually adjusted through some device, such as a variable autotransformer, to a particular value for any given balancing speed, because the generator voltage, and hence the generator current, varies approximately linearly with speed. Unavoidable small changes in speed and inaccuracies in reading and adjusting the current meter appear as errors in the final reading.

The inductances of the wattmeter current coil, the variable autotransformer, and the generator cause a large change in the phase angle of the current with respect to the generator-induced voltage as the speed of balancing and therefore, the frequency of the voltag is changed. Thus, the angle setting on the generator does not correctly determine the phase angle of the current with respect to the rotating mass. This necessitates the use of a calibration curve of phase shift versus balancing speed. Use of the calibration curve seriously limits the accuracy of phase angle determination especially at low speeds where the slope of the calibration curve is very steep.

In an effort to overcome the disadvantages of the use of a wattmeter, systems such as that shown in U.S. Pat. No. 2,636,381 to A. C. Hagg and D. V. Wright have been developed. In such a system, vibration analyzing is achieved with the use of a rectifying modulator of the ring or bridge type having a square wave generator of constant voltage connected across one pair of its terminals and a sinusoidal vibration pickup voltage impressed across its other terminals. The square wave signal is obtained from a two-section commutator connected to a rotating body to be balanced with four brushes spaced 90° apart around its periphery in order to provide two voltages of 90° phase displacement relative to each other. The arrangement is such that the square waves, both positive and negative, persis for less than one-half cycle (i.e., less than 180°). When these are used to gate or modulate the vibration signal in the bridge rectifier, the net direct current output voltage due to harmonics is always zero and, hence, the harmonics do not influence the output. With this arrangement, some of the adjustments necessary with the wattmeter-type balancing equipment are eliminated; and the use of phase calbriation curves is no longer required except possibly on special applications.

While the apparatus shown in the aforesaid Patent No. 2,636,381 operates satisfactorily for its intended purpose, difficulty is sometimes encountered in obtaining a modified square wave signal at higher speeds with a mechanical square wave generator of the type described in that patent.

SUMMARY OF THE INVENTION

As an overall object, the present invention seeks to provide new and improve vibration analyzing apparatus based on the use of square wave modulation of a vibration signal to eliminate harmonics, which apparatus can be used over a wide range of rotating speeds, including high speeds.

More specifically, an object of the invention is to provide vibration analyzing apparatus of the type described wherein a sine wave signal, produced by a generator coupled to a shaft of a rotating body, is converted into two square wave signals each having negative square wave excursions which occur, respectively, during alternate half cycles of the sine wave but whose leading edges occur after the beginning of each half cycle and whose trailing edges occur prior to the termination of each half cycle.

In accordance with the invention, vibration analyzing apparatus is provided including a transducer operatively associated with a rotating body to be balanced and adapted to produce a displacement signal having an amplitude and phase dependent upon the amount and location of unbalance in a rotating body. In most cases, this transducer will be of the electromagnetic type having a probe which engages a bearing or other part which houses a rotating body. Alternatively, however, the transducer may be of the type comprising an electrical oscillator having a tank circuit including an inductive pickup element, characterized in that the amplitude of the oscillations produced by the oscillator will be a function of the displacement between the tank circuit inductive element and an adjacent rotating body.

A sine wave generator is operatively connected to the rotating body and adapted to produce a pair of sine wave signals displaced in phase with respect to each other by 90°. In the usual case, the generator is of the mechanical type having a rotor coupled to the shaft of a rotating body and a pair of windings on an outer rotatable stator displaced with respect to each other so as to produce output sine wave signals, one of which lags the other by 90°. Static circuit means are coupled to the sine wave generator and adapted to convert a sine wave signal at the output of the generator into a pair of square wave signals each of which has square wave excursions which occur on alternate half cycles of the sine wave signal; the excursions in one square wave signal occurring during positive swings of the sine wave signal and those of the other square wave signal occurring during negative swings. In order to eliminate the possibility of false output signals due to harmonic frequencies, the positive and negative square wave excursions have widths less than the extent of one-half cycle of the original sine wave signal. That is, their leading edges occur after the beginning of each half cycle and their trailing edges occur before the end of each half cycle in equal amounts. The resulting square wave signals are then utilized in a demodulator for demodulating the displacement signal to produce an output signal having an average direct current value dependent upon the phase angle between the displacement and sine wave signals. This resultant output signal is then $$V \cos X$$

where V is the pickup voltage and X is the phase angle.

The above and other objects and features of the invention will become apparent from the following detailed description taken in connection with the accompanying drawings which form a part of this specification, and in which:

DESCRIPTION OF THE PREFERRED EMBODIMENT

FIG. 1 is a schematic block diagram of the vibration analyzing apparatus of the invention;

FIGS. 2A, 2B and 2C are waveforms illustrating the operation of the system of FIG. 1;

FIG. 3 is a schematic diagram showing the manner in which a point of unbalance can be located on a rotating body with the apparatus of FIG. 1;

FIG. 4 is a detailed schematic cricuit diagram of the vibration analyzing apparatus shown in FIG. 1; and FIG. 5 comprises waveforms illustrating the manner in which harmonics are eliminated in the demodulator of the invention such that only a vibration signal, which corresponds to the frequency of the phase reference generator and, therefore, the running speed of the mass to be balanced, will be applied to an amplitude meter.

With reference now to the drawings, and particularly to FIG. 1, a rotating body to be balanced is indicated generally by the reference numeral 10 and is supported on two bearings 12 and 14. In contact with the bearing 12 is an electromagnetic vibration pickup 16 of any type well known in the art adapted to transform mechanical sinusoidal vibrations into a sinusoidal displacement signal which is applied to amplifier 18. Of particular utility in obtaining the displacement signal is the device disclosed in the aforementioned copending application 1,354.

Coupled to the shaft of the rotating body 10 is a sine wave generator 20 having two stator windings 22 and 24 spaced 90° apart or at least arranged such that the sine wave signal appearing across winding 22 will always be 90° out of phase with respect to that on winding 24. Either the voltage on winding 22 or that on winding 24 can be applied through switch 25 to a square wave generator 26 which converts the sine wave input into two square wave outputs in a manner hereinafter described. The outputs of the amplifier 18 and square wave generator 26 are then applied to a demodulator 28 which, as will be seen, produces an output proportional to $$E \cos \theta$$

where E is the RMS value of the component of the displacement voltage at the output of amplifier 18 which matches the frequency of the signal froom generator 20 and $\theta$ is the phase angle of the pickup signal with respect to the generator signal. This voltage is then applied to a direct current meter 30 which indicates the magnitude of the voltage. In shunt with the meter 30 is a capacitor 32 which shunts any alternating current components at the output of the demodulator 28 to ground.

The operation of the circuit of FIG. 1 can perhaps best be understood by reference to FIGS. 2A through 2C which represent the conditions which occur when the phase angle $\theta$ between the signal at the output of generator 20 and the displacement signal from pickup 16 is 0°, 90° and 180°, respectively. The input waveform applied to the square wave generator, identified as waveform A in FIGS. 2A–2C is, of course, a sine wave. Likewise, waveform B at the output of amplifier 18 on lead 34 is also a sine wave which may or may not lag the sine wave of waveform A by a phase angle $\theta$. Waveform C at the output of square wave generator 26 on lead 36 will normally comprise a positive voltage except when the input voltage from the generator is greater than one-half of its peak positive value. This will occur from 30° to 150°. During this time, the output on line C will go to a negative value.

The output of the square wave generator on lead 38 (waveform D) is also normally positive. However, it will go to a negative value when the input voltage is more negative than half the value of the peak negative voltage. This occurs between 210° and 330° of the input voltage. When the voltage of waveform B is positive while the voltage of waveform C is negative, the output voltage E will be equal to the voltage of waveform B. Similarly, if the voltage of waveform D is negative and the voltage of waveform C is positive, the output voltage E will be equal to the inverted value of the voltage of waveform B. If the voltage of both waveforms C and D is positive, the output voltage E will be zero regardless of the voltage of the displacement signal B.

For the particular case shown in FIG. 2A, the displacement signal (waveform B) and the sine wave output of generator 20 (waveform A) are in phase and the phase angle $\theta$ is zero. This produces a maximum positive direct current output voltage. When, however, the displacement signal (waveform B) lags the output of generator 20 by 90° as illustrated by the waveforms of FIG. 2B, the area of the resultant waveform E below the zero axis is equal to that above the zero axis and the average direct current output is zero. When the phase angle $\theta$ is increased to 180° as illustrated in FIG. 2C, the average direct current output is then a maximum negative value.

In a balancing operation, the switch 25 will connect one of the windings 22 or 24 to the input of the square wave generator 26. The stator which carries the windings 22 and 24 will then be rotated manually to a position where the output indicated by the meter 30 is zero. At this point, it is known that the displacement signal on lead 34 is 90° out of phase with respect to the voltage on winding 22, for example. Thereafter, by reversing the position of switch 25, the voltage applied to the square wave generator 26 will now be 90° out of phase with respect to that previously applied whereby waveforms A and B will be in phase with each other as illustrated by FIG. 2A, for example, and the meter 30 will read its maximum value. This reading, therefore, is now proportional to the amount of magnitude of the vibration.

One manner in which the point of unbalance can be located is illustrated in FIG. 3. On the stator of generator 20 is a 0° marking which coincides with the point at which the sine wave output across winding 24 will be at a maximum. For simplicity, the rotor of generator 26 is indicated as a bar magnet 40 having north and south poles and rotating in the direction of arrow 41. On the rotor is a 0° marking in alignment with the bar magnet 40. It will be assumed that the rotor is connected to the shaft of the member 10 such that the heavy spot 42 on the rotating member is displaced at an angle of 45° with respect to the axis of the bar magnet 40. Assuming that the pickup 16 is in the position shown, and assuming also that the stator is rotated to its 0° position such that the winding 24 are in the position shown, the waveform generated across winding 24 will lag that produced by the pickup 16 by 45°. That is, the maximum positive excursion of the displacement signal produced by pickup 16 will occur with the heavy spot 42 directly opposite the pickup, but the maximum positive excursion of the sine wave developed across winding 24 will not occur until the magnet 40 is rotated into a vertical position, 45° of rotation later. In order for the two signals to be in phase, the stator will have to be rotated in a clockwise direction as viewed in FIG. 3 by 45°, at which time the meter 30 will indicate the maximum output voltage. Now, if the rotating body 10 is stopped and then manually rotated in a clockwise direction from the zero marker on the rotor for 45° starting from top dead center, it is known that the point of unbalance is directly opposite the pickup 16. Weights can then be added to the rotating body 10 directly opposite the point of unbalance 42 until the reading on the meter 30 is zero, at which point it is known that the rotating body is properly balanced.

With reference now to FIG. 4, the sine wave voltage across winding 22 or winding 24 is applied through switch 25 and resistor 44 to two identical circuits 46 and 48 in the square wave generator 26. Circuit 48, for example, includes diodes 50 and 52. Diode 50 has its anode connected to the upper end of the winding 22 or winding 24, the junction of the two diodes 50 and 52 being connected through resistor 54 to the lower ends of the windings 22 and 24. Connected between the cathode of diode 52 and the lower ends of the windings 22 and 24 is a capacitor 56; and in shunt with the capacitor 56 is a voltage divider comprising resistors 58 and 60 of equal magnitude such that the voltage at the midpoint between the resistors 58 and 60 will be one-half of the voltage developed across the capacitor 56. The circuit 46 is identical to circuit 48; however it will be appreciated that the diodes 50 and 52 of circuit 48 will conduct during one-half cycle of the applied sine wave appearing across winding 22 or 24 while diodes 50 and 52 of circuit 46 will conduct on the other half cycle.

The capacitors 56 in the respective circuits 46 and 48 are charged to values corresponding to the peak value of the generator input signal. Discharging of capacitors 56 through resistors 54 is prevented by diodes 52; while the values of resistors 58 and 60 are sufficiently high, on the order of 1 megohm, to prevent material discharging of the capacitor 56 through them. The junction of resistors 58 and 60 of circuit 48 is connected to one input terminal of a differential amplifier 62. The input applied to this terminal, therefore, is equal to one-half the peak value of the generator input signal. The voltage across resistor 54 of circuit 48, comprising the actual output generator voltage, is applied to the other input terminal of differential amplifier 62. Connected across the two input terminals of differential amplifier 62 are limiting diodes 64 which limit the magnitude of the differential signal applied to the amplifier to about 0.6 volt.

The amplifier 62 will produce an inverted output only when the input to its upper terminal is greater than that on its lower terminal. This occurs at a phase angle of 30°. The actual generator signal on the upper terminal falls below one-half its peak value at 150°. Consequently, the output of the amplifier 62 comprises waveform C shown in FIGS. 2A–2C.

Similarly, the junction of resistors 58 and 60 in circuit 46 is connected to the lower terminal of differential amplifier 66 and comprises one-half the peak generator output voltage. The other or upper terminal of amplifier 66 is connected to the upper end of resistor 54 in circuit 46 and, hence, the other half of cycle of the applied sine wave is applied to this terminal. Again, the inverted output of the amplifier 66 will begin at 210° when the actual output generator voltage exceeds one-half its peak value and terminates at 330° when it drops below one-half its peak value. Consequenlty, the output of amplifier 66 comprises waveform D shown in FIGS. 2A–2C.

Wareform C at the output of amplifier 62 is applied through resistor 78 to the base of a first NPN switching transistor 80 in demodulator 28. Similarly, waveform D at the output of amplifier 66 is applied through resistor 82 to the base of a second NPN switching transistor 84. Normally, the two transistors 80 and 84 will conduct; however when a negative pulse appears in waveform C or D, respectively, the transistors 80 and 84 will cut off and block current flow to ground.

The pickup coil 16 is connected through potentiometer 86 to the input of amplifier 18, the output of the amplifier 18 being applied via lead 88 and resistors 90 and 92 to the collectors of transistors 80 and 84. Normally, when the transistors 80 and 84 are conducting, the displacement signal on lead 88 will be shunted to ground. When the transistors 80 and 84 are not conducting, the signals on their collectors are applied through resistors 94 and 96, respectively, to two input terminals of an amplifier 98. With transistor 80 cut off in response to a negative pulse in waveform C and transistor 84 conducting, amplifier 98 performs as a non-inverting amplifier. When transsistor 84 cuts off in response to a negative pulse in waveform D while transistor 80 conducts, the amplifier 98 performs as an inverting amplifier. Consequently, the output of amplifier 98 is always of the same polarity as shown by waveform E in FIGS. 2A–2C. When both of the transistors 80 and 84 are conducting, all displacement signals are shunted to ground and the output of amplifier 98 is zero. The resulting output is applied to the meter 30 to indicate the magnitude of $E \cos \theta$. Note that the magnitude of the direct current voltage applied to meter 30 is not the true RMS value of the displacement signal since portions of the sine wave have been clipped off by the square wave action. It is, however, proportional to the RMS value.

An important characteristic of any vibration analyzing apparatus lies in the behavior of such a system relative to harmonics of the fundamental vibration voltage. That is, the system should be insensitive to the second and higher order harmonics so that these harmonics, which frequently occur in balancing equipment, cannot affect the accuracy of the equipment. The importance of providing square wave pulses in waveforms C and D which do not persist for a complete 180° cycle in order to eliminate harmonics is shown in FIG. 5. The second harmonic of the vibration signal for the case where the displacement signal is in phase with the output of generator 20 is illustrated by waveform $B_2$. Note that the positive and negative portions of the waveform during the period of conduction are equal, meaning that the net output direct current voltage is zero. Furthermore, even though the waveform $B_2$ should shift to the left or right in phase, the positive and negative areas of conduction will always be the same.

The same is true of the third harmonic illustrated by the waveform $B_3$. Here, again, the positive and negative areas of conduction are always the same. If, however, the square waves in waveforms C and D persist for a complete one-half cycle, it can be appreciated that this would not be the case. That is, the positive areas of conduction would be greater than the negative, producing a net positive direct current output due to harmonic which would affect the desired, true reading.

While the signal from the pickup 16 has been referred to above as a displacement signal, it should be understood that a velocity-type pickup can be used equally well to produce a signal proportional to the velocity of the vibration. If the motion is sinusoidal, which is always the case for balancing, the velocity signal is proportional to the frequency of the vibration times the displacement amplitude and is displaced in phase by 90° from the displacement signal. The meter reading produced by the velocity signal is, therefore, proportional to the product of the frequency and the displacement amplitude and the indicated phase angle must be adjusted by 90°. An acceleration signal may be used also which results in a meter reading proportional to the product of the frequency squared times the displacement amplitude and a phase angle displaced by 180°. All such signals are referred to collectively as a "vibration signal" in the following claims.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In vibration analyzing apparatus, the combination of a transducer operatively associated with a rotating body to be balanced and adapted to produce a vibration signal having an amplitude and phase dependent upon the amount and location of unbalance in a rotating body, a sine wave generator operatively connected to said rotating said body and adapted to produce a pair of sine wave signals displaced in phase with respect to each other, static circuit means coupled to said sine wave generator and adapted to convert a sine wave signal at the output of said generator into a pair of square wave signals each of which has square wave excursions of the same polarity which occur on alternate half cycles of the sine wave signal, the excursions in one square wave signal occurring during positive swings of the sine wave signal and those of the other square wave signal occurring during negative swings of the sine wave signal, said square wave excursions having widths less than the extent of one-half cycle of the original sine wave signal, said static circuit means including a pair of differential amplifiers each having a pair of input terminals, means connecting one terminal of each amplifier to said sine wave generator so that essentially the full sine wave output voltage from said generator is applied thereto, means including a capacitor and diodes connecting the other terminal of each amplifier to said sine wave generator such that a voltage equal to one-half the peak voltage of said essentially full sine wave output voltage will be applied to said other terminals, and a demodulator responsive to said square wave signals and said vibration signal for producing an output signal having an average direct current value dependent upon the phase angle between the vibration and sine wave signals and the magnitude of the vibration signal.

2. The vibration analyzing apparatus of claim 1 including a meter connected to the output of said demodulator for indicating the magnitude of the average direct current value.

3. The vibration analyzing apparatus of claim 1 wherein said pair of sine wave signals produced by said generator are displaced in phase with respect to each other by 90°, and including switch means for applying either one of said sine wave signals to said static circuit means.

4. The vibration analyzing apparatus of claim 1 wherein said pair of sine wave signals is produced by stator windings carried on a rotatable stator for a generator having its rotor connected to said rotatable body.

5. The vibration analyzing apparatus of claim 1 wherein said demodulator includes a pair of transistor switches adapted to shunt said vibration signal to ground when conducting, one of said square wave signals being applied to the base of one of said transistor switches and the other of said square wave signals being applied to the base of the other of said transistor switches.

6. The vibration analyzing apparatus of claim 5 including means for applying said vibration signal to the collectors of both of said transistors, and a differential amplifier having a pair of input terminals connected to the respective collectors of said transistors, the amplifier acting to invert signals applied to one of its input terminals but not those applied to the other of its input terminals.

7. The vibration analyzing apparatus of claim 6 including a direct current meter connected to the output of said differential amplifier.

References Cited

UNITED STATES PATENTS 2,636,381　4/1953　Hagg et al. _____ 73—464

FOREIGN PATENTS 752,735　7/1956　Great Britain _____ 73—464
860,847　2/1961　Great Britain.

JAMES J. GILL, Primary Examiner